March 26, 1940.     E. WALKER     2,194,960

VALVE

Filed June 13, 1938

INVENTOR.
EDWARD WALKER
BY
ATTORNEYS

Patented Mar. 26, 1940

2,194,960

UNITED STATES PATENT OFFICE 2,194,960

VALVE

Edward Walker, Cliffside Park, N. J.

Application June 13, 1938, Serial No. 213,328

1 Claim. (Cl. 251—44)

This invention relates to improvements in valves and has particular reference to washers such as are employed in water faucets and the like.

In the production and use of various types of valve washers commonly employed on water faucets, two major difficulties have been experienced. First, with those washers which are designed to be attached to the valve stem by a screw so that the washer must always turn with the stem when the latter is adjusted, the wear on the surface of the washer which engages the valve seat is excessive due to the turning movements of the valve on and relative to said seat, and as a consequence, more or less frequent replacements are necessitated. Aside from such wear, the replacement of the washer is rendered comparatively difficult because of the necessity of having to remove the screw which holds the washer to the stem, especially when the head of the screw becomes corroded through contact with the liquid in the faucet. Secondly, in an attempt to overcome such difficulties as above mentioned, several types of valve washers have been designed which may be broadly classified as floating washers that are not attached to the valve stem but are merely provided with extensions that project into the openings in the valve stems which ordinarily receive the screws of the first mentioned type, such screws, in this instance, being dispensed with. Such floating washers have largely reduced the amount of wear thereon because of the fact that they do not turn on their seats when adjustments of the valve stem are effected, but they are open to the fault of "hammering" due to their floating condition.

One of the objects of the present invention is to overcome the difficulties experienced in the use of previously designed washers by providing a washer of simple and practical construction which may be easily removed from the screw of a valve stem and a new washer replaced thereon in such a manner that the same will not turn with its stem when engaged with the valve seat, and, at the same time, will be securely attached to the stem so that it cannot be readily dislodged in the ordinary operations thereof, and will prevent the objectionable feature of "hammering."

The above and other objects will appear more clearly from the following detailed description when taken in connection with the accompanying drawing which illustrates preferred embodiments of the inventive idea.

Figure 1:
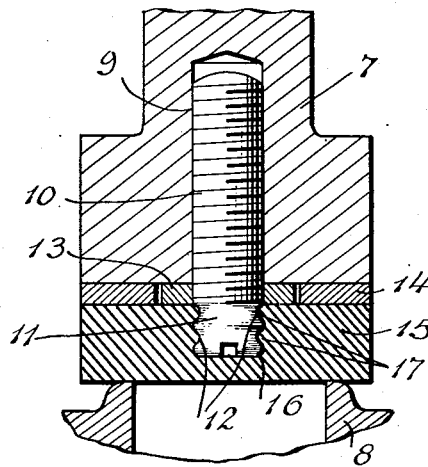
Figure 1 is a fragmentary vertical longitudinal section through a valve structure showing one form of the present invention.
Figure 2:
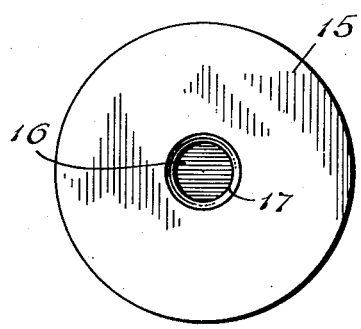
Figure 2 is a top plan view of the washer shown in Figure 1.

Referring more particularly to the embodiment of the invention shown in Figures 1 and 2, the numeral 7 indicates the valve stem of a valve construction such as may be utilized in water faucets, and the numeral 8 designates the valve seat through which the flow of liquid is controlled by the raising and lowering of the valve stem in the customary manner. As is usual with valves of this type the stem 7 is provided with a screw threaded bore 9 for receiving the shank of a screw 10. In valves commonly used, an ordinary screw is employed to fasten the valve washer to the stem with the head of the screw retaining the washer in position and exposed on the under surface thereof where it is subject to corrosion. In the present instance, the screw 10 is provided with a head 11, the greatest diameter of which does not exceed that of the shank of the screw, and said head is provided with spaced circumferential grooves 12 so the periphery of said head will assume a convolute form. When the screw 10 is threaded into the bore 9 it is desirable to secure the same against inadvertent turning so that the head 11 will, at all times, be projected from the lower surface of the stem 7 a definite distance. For this purpose a lock nut 13 may be threaded upon the outer end of the shank of the screw and abutted against the end of the stem 7. After the screw has thus been mounted, a flat washer 14 which may be of metal and which has a central opening to receive the lock nut 13, is placed against the stem in encircling relation to said nut. Thereupon the valve washer 15 is mounted in position upon the head 11 of the screw.

This washer 15 may be made of any desirable material such as rubber or fibre and, in the present embodiment, is in the form of a flat disc having a central recess 16 therein which extends only partially through said washer from the inner surface thereof so that when the washer is placed upon the head 11 the latter will be entirely enclosed within the body of the washer and therefore will not be exposed to the liquid flowing through the valve. The wall of the recess 16 is provided with spaced annular beads 17 which impart a convolute form to said wall similar to that of the head 11 so that the surface of said wall will be in intimate contact and snugly engage the periphery of the head when the washer is in position thereon. With such a construction, it is only necessary to insert the outer extremity of the head 11 into the mouth of the recess 16 and then by linear pressure the washer may be forced on to said head where it will be effectively maintained against accidental detachment by the convolute surfaces. At the same time, the washer 15 will be free to rotate about the head 11 as an axis so that when the under or outer surface of the washer is engaged with the valve seat 8 said washer will remain stationary thereon as long as it is in contact therewith when the stem 7 is turned to adjust the valve. In this manner undue wear upon the under surface of the washer 15 is avoided.

Figure 3:
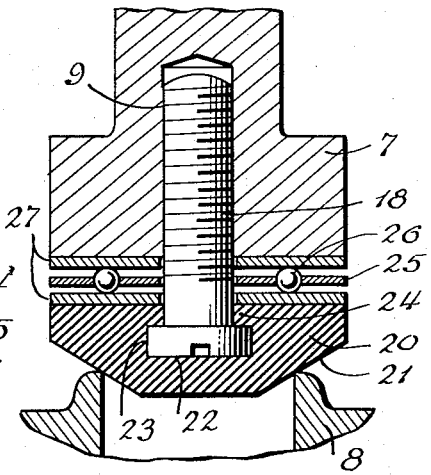
Figure 3 is a view like Figure 1 illustrating another form of valve structure.
Figure 4:
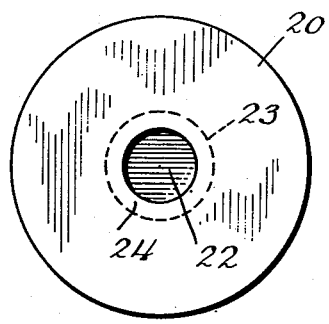
Figure 4 is a top plan view of the washer shown in Figure 3.

In Figures 3 and 4, a screw 18 is employed which has a head 19 larger than the diameter of the shank of the screw, and the washer 20 may be formed with a frusto-conical surface 21 adapted for engagement with the valve seat 8. Like the washer 15, the washer 20 is provided with a recess 22 extending only partially through the body of the washer. Said recess 22 is formed with a counterbore 23 for receiving the head 19 of the screw when the washer is forced upon the latter, and said counterbore forms an annular lip 24 contiguous to the inner surface of the washer, which lip engages behind the head 19 of the screw when the washer is positioned thereon.

An anti-friction device is provided for interposition between the stem 7 and the washer 20 for the purpose of preventing any turning movement of the washer 20 on the seat 8 when the valve stem 7 is rotated to adjust the valve. Said device comprises a race 25 having ball or roller bearings 26 mounted thereon and disposed on opposite sides of said race for engagement with said bearings are the bearing plates 27. This assembly is placed upon the shank of the screw 18 before the latter is threaded into the bore 9 of the stem 7 and when mounting the washer 20 on the projecting end of the screw, said washer may be slightly distorted so that the head of the screw 19 can be readily inserted in the counterbore 23 when forcing said washer upon said head.

Figure 5:
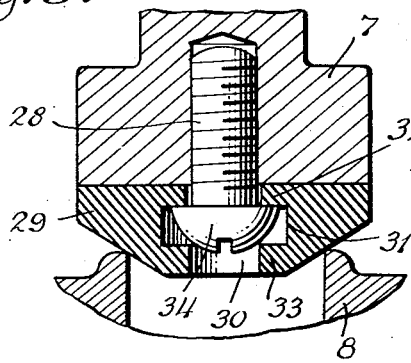
Figures 5 and 6 are views similar to Figures 1 and 2, illustrating other embodiments of the valve structure.

In Figure 5, an ordinary screw 28 may be threaded on to the valve stem 7 and the washer 29 may have the same exterior configuration as the washer 20. However, said washer, as distinguished from the washers 15 and 20, is provided with a recess 30 which extends completely through the body of the washer and is provided with a central counterbore 31 which forms the inner and outer annular lips 32 and 33 that engage respectively, the back and outer surfaces of the screw head 34 when the washer is forced into position on the screw with said head extending into the counterbore 31. By the formation of such a recess 30, the head of the screw is exposed through the outer end of said recess so that access may be had to the screw with a screw driver to make any adjustments that may be necessary to properly position the washer 29 on the stem. When proper care is taken, the head of the screw may be engaged with the lip 32 in such manner as to cause the inner surface of the washer to properly abut the end of the stem 7 and yet permit of relative turning movement between said stem and washer when the latter is engaged with the valve seat 8, thus avoiding undue wear upon the outer surfaces of the washer.

Figure 6:
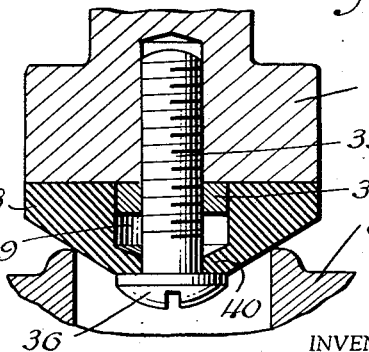

Again, in Figure 6, the screw 35 may be of an ordinary type having an enlarged head 36 and, if desired, said screw may be secured in an adjusted position relative to the stem 7 by means of a lock nut 37 threaded on the shank of the screw and engaged with said stem. The washer 38 may have substantially the same confuration as the washers 20 and 29 and in the present embodiment said washer is formed with a central recess 39 of sufficient diameter at its inner end to receive the lock nut 37, and restricted in size at its outer end by the annular lip 40 which is adapted to engage behind the head 36 of the screw when the washer is in position thereon. In this instance the head 36 of the screw is exposed, like in the form shown in Figure 5, so that access may be had to the screw for purposes of adjustment. As in the other embodiments described, a turning movement of the valve stem 7 may be effected relative to the washer 38 when the latter is engaged with the seat 8 so as to avoid wear upon the washer.

What is claimed is:

In a valve structure for use on water faucets and the like, a valve stem, a screw having a portion of its threaded shank and a head projecting from said stem, a washer having a recess in one surface only thereof adapted to receive said head with the latter snugly engaging the wall of said recess, a lock nut threaded on the projecting threaded portion of the shank of said screw, and a flat washer embracing said lock nut and interposed between adjacent surfaces of said stem and first named washer.

EDWARD WALKER.